(12) United States Patent
Chen et al.

(10) Patent No.: US 7,677,878 B2
(45) Date of Patent: Mar. 16, 2010

(54) SLIDE HAVING A FIXING MECHANISM OF A SLIDE INSERT

(75) Inventors: Chih-yu Chen, Tu-Cheng (TW); Jian-guang Huang, Tu-Cheng (TW); Yun-ging He, Tu-Cheng (TW); Chun-yan Wu, Tu-Cheng (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 520 days.

(21) Appl. No.: 11/727,306

(22) Filed: Mar. 26, 2007

(65) Prior Publication Data
US 2008/0236221 A1   Oct. 2, 2008

(51) Int. Cl.
*B29C 33/44* (2006.01)
*B29C 45/33* (2006.01)

(52) U.S. Cl. .................. 425/190; 425/192 R; 425/577; 425/468; 425/DIG. 58; 425/470

(58) Field of Classification Search .................. 425/190, 425/191, 192 R, 577, 451, 451.7, 451.9, 441, 425/467–468, 470, DIG. 58
See application file for complete search history.

(56) References Cited

U.S. PATENT DOCUMENTS

| | | | | | |
|---|---|---|---|---|---|
| 4,515,342 | A | * | 5/1985 | Boskovic | 249/122 |
| 4,768,747 | A | * | 9/1988 | Williams et al. | 249/63 |
| 4,828,480 | A | * | 5/1989 | Smith | 425/562 |
| 4,839,131 | A | * | 6/1989 | Cloeren | 264/173.12 |
| 5,312,243 | A | * | 5/1994 | Mertz | 425/577 |
| 5,316,467 | A | * | 5/1994 | Starkey | 425/438 |
| 5,397,226 | A | * | 3/1995 | Vandenberg | 425/192 R |
| 5,407,344 | A | * | 4/1995 | Rombalski et al. | 425/190 |
| 6,235,231 | B1 | * | 5/2001 | Martin | 264/328.1 |
| 6,443,723 | B1 | * | 9/2002 | Buttigieg | 425/214 |
| 6,659,760 | B2 | * | 12/2003 | Liao et al. | 425/577 |
| 7,121,823 | B2 | * | 10/2006 | Chen et al. | 425/438 |
| 7,153,126 | B2 | * | 12/2006 | Takao | 425/444 |
| 7,387,505 | B1 | * | 6/2008 | Chen et al. | 425/190 |
| 7,435,079 | B2 | * | 10/2008 | Wang et al. | 425/577 |
| 2003/0068405 | A1 | * | 4/2003 | Persson | 425/577 |
| 2004/0247726 | A1 | * | 12/2004 | Takemoto et al. | 425/190 |
| 2007/0172539 | A1 | * | 7/2007 | Wang et al. | 425/577 |
| 2008/0241304 | A1 | * | 10/2008 | Chen et al. | 425/192 R |

FOREIGN PATENT DOCUMENTS

| | | | | |
|---|---|---|---|---|
| FR | 2595291 | A1 | * | 9/1987 |
| JP | 56049240 | A | * | 5/1981 |
| JP | 56063428 | A | * | 5/1981 |

* cited by examiner

*Primary Examiner*—Philip C Tucker
*Assistant Examiner*—Dimple N Bodawala
(74) *Attorney, Agent, or Firm*—Rosenberg, Klein & Lee

(57) ABSTRACT

A slide having a fixing mechanism of a slide insert includes a slide body, a slide insert and a slide core. The slide body has a connecting portion and an inserting portion. The connecting portion defines a locating hole which stretches through the top surface to bottom surface of the connection portion. The inserting portion defines an inserting hole passing through the front and back surface of the inserting portion. A core hole is defined at the junction of the connecting portion and the inserting portion. The slide insert is located in the inserting hole. One end of the slide insert protrudes around to form a preventing part. The slide core is inserted in the core hole to fix the preventing part between the back surface of the inserting portion and the slide core. Then the slide insert is fixed in the slide.

2 Claims, 5 Drawing Sheets

SLIDE HAVING A FIXING MECHANISM OF A SLIDE INSERT

BACKGROUND OF THE INVENTION

1. Field of the Invention

The present invention relates to a slide, and more particularly to a slide having a fixing mechanism of a slide insert.

2. The Related Art

A conventional mold includes a slide and a slide insert. The front of the slide defines a receiving hole. Both sides of the slide define screw holes which pass through the receiving hole. The slide insert is held in the receiving hole with the front end stretching out of the front of the slide. Both sides of the slide insert either define screw holes. Two screws are inserted into the screw holes of the slide and further inserted into the screw holes of the slide insert. Then the slide insert is fixed in the slide.

The aforesaid slide utilizes the screws to fix the slide insert in the slide. However, the screws just adapt to fixing the larger slide insert in the slide. Sometimes when products are very small, in order to accord with the products, the slide insert must be very small. That is, the screws cannot fix the small slide insert in the slide. Then it causes the products shaped not well.

SUMMARY OF THE INVENTION

Accordingly, an object of the present invention is to provide a slide having a fixing mechanism of a slide insert to fix the slide insert steadily when the slide insert is very small. The slide includes a slide body, the slide insert and a slide core. The slide body has a connecting portion and an inserting portion. The connecting portion defines a locating hole which stretches through the top surface to bottom surface. The inserting portion defines an inserting hole passing through the front and back surface. A core hole is defined at the junction of the connecting portion and the inserting portion. The slide insert is located in the inserting hole. One end of the slide insert protrudes around to form a preventing part. The slide core inserted in the core hole has a locating pillar. The locating pillar withstands the back surface of the preventing part of the slide insert. One end of the locating pillar protrudes outside to form a buckling part, and the buckling part buckles with the bottom of the core hole of the slide body.

As described above, the slide core is inserted in the core hole as well as the slide insert is inserted in the inserting hole. Then the preventing part of the slide insert is fixed between the slide core and the back surface of the inserting portion of the slide body. Therefore, the slide insert is fixed steadily in the slide body when the slide insert is small accordance with a small product.

BRIEF DESCRIPTION OF THE DRAWINGS

A detailed explanation of a preferred embodiment of the present invention will be given, with reference to the attached drawings, for better understanding thereof to those skilled in the art.

DETAILED DESCRIPTION OF THE PREFERRED EMBODIMENT

Figure 1:
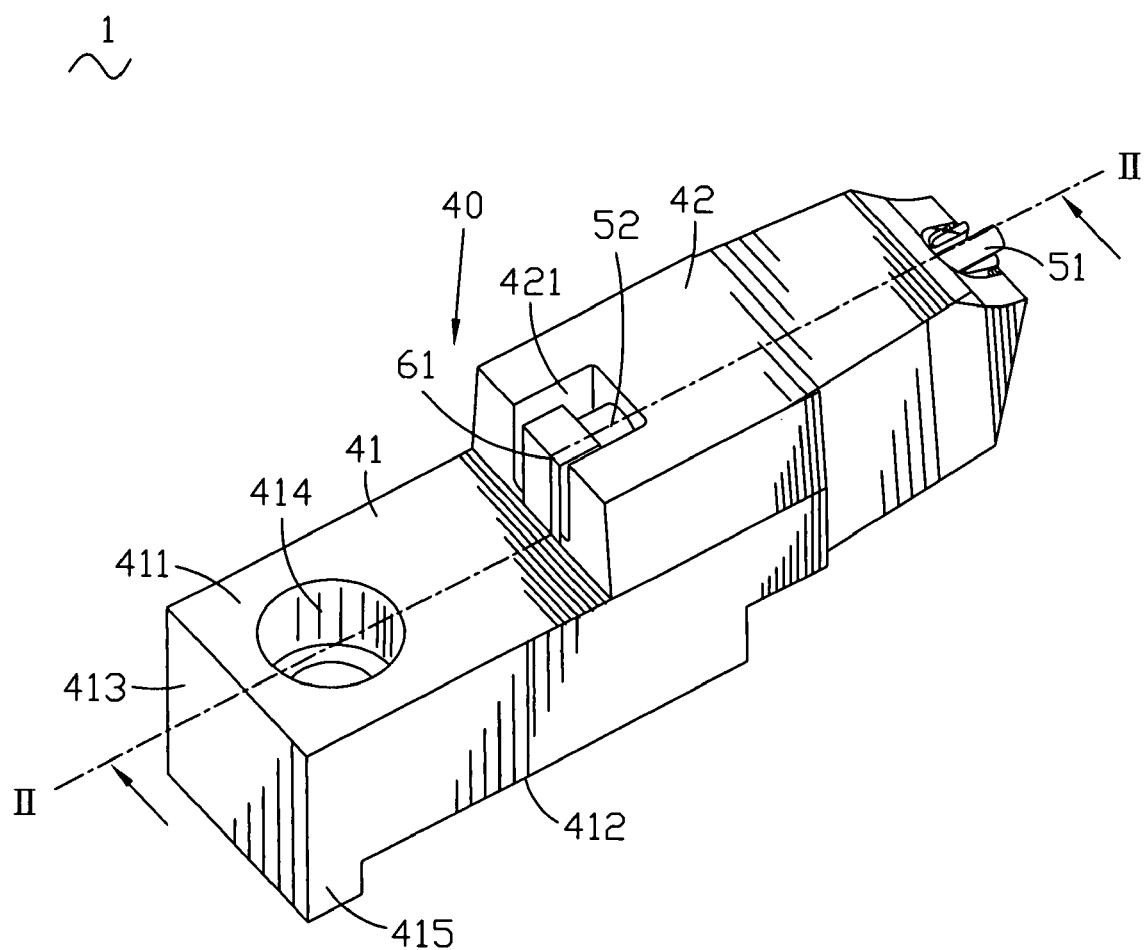
FIG. 1 is a perspective view of a slide having a fixing mechanism of a slide insert of the present invention.
Figure 2:
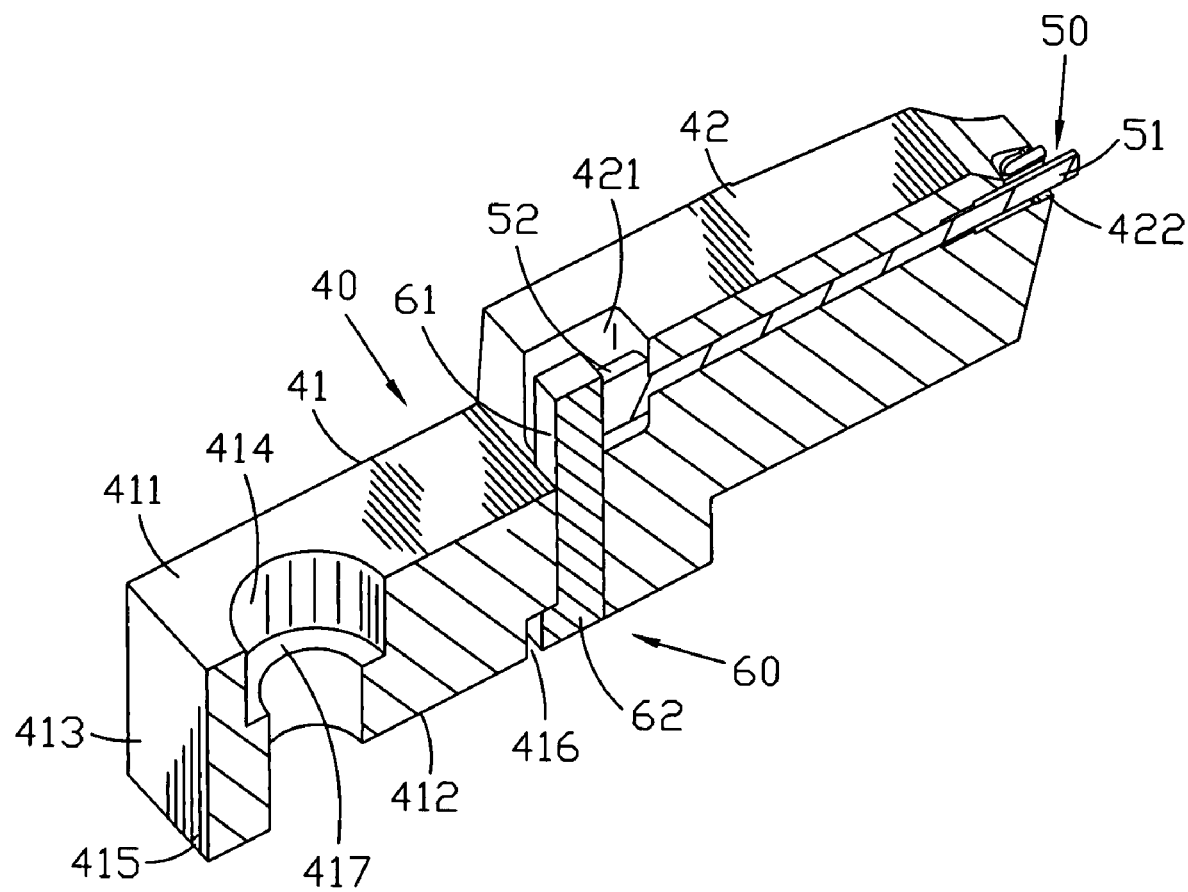
FIG. 2 is a cross-sectional view of FIG. 1.

Referring to FIG. 1 and FIG. 2, a slide having a fixing mechanism of a slide insert 1 includes a slide body 40, a slide insert 50 and a slide core 60. All of these will be respectively described in detail hereinafter.

The slide body 40 has a connecting portion 41 and an inserting portion 42. The connecting portion 41 is rectangular and includes a top wall 411, a bottom wall 412 and a back wall 413. The rear area of the top wall 411 defines a locating hole 414 stretching through the top wall 411 to the bottom wall 412, and at the middle the locating hole 414 protrudes inside to form a shoulder 417. The bottom surface of the back wall 413 extends downward and forms a mounting portion 415. The rear of the inserting portion 42 is placed on the front of the top wall 41 with the inserting portion 42 and the connecting portion 41 shaped in a unity. The inserting portion 42 defines a receiving hole 421 at the rear of the top surface. The back surface of the inserting portion 42 defines an inserting hole 422 passing through the back and front surface of the whole inserting portion 42. The front of the inserting portion 42 extends forward and at the same time becomes more and more narrow to form a wedge shape. At the junction of the connecting portion 41 and the inserting portion 42, a core hole 416 which passes through the top wall 411 to the receiving hole 421 is defined.

The slide insert 50 inserted in the inserting hole 422 has a circular shaft 51. One end of the shaft 51 protrudes around and forms a circular preventing part 52. The preventing part 52 is received in the receiving hole 421.

The slide core 60 inserted in the core hole 416 includes a rectangular locating pillar 61. One end of the locating pillar 61 protrudes outside to form a buckling part 62.

Referring to FIGS. 1-2 again, the shaft 51 of the slide insert 50 is inserted in the inserting hole 422 of the slide body 40 with the front surface of the preventing part 52 being against the back surface of the inserting portion 42. The locating pillar 61 of the slide core 60 is inserted in the core hole 416. The locating pillar 61 and the preventing part 52 are received in the receiving hole 421. The locating pillar 61 withstands the back surface of the preventing part 52 in order to fix the slide insert 50. The buckling part 62 of the slide core 60 buckles with the bottom of the core hole 416.

Figure 3:
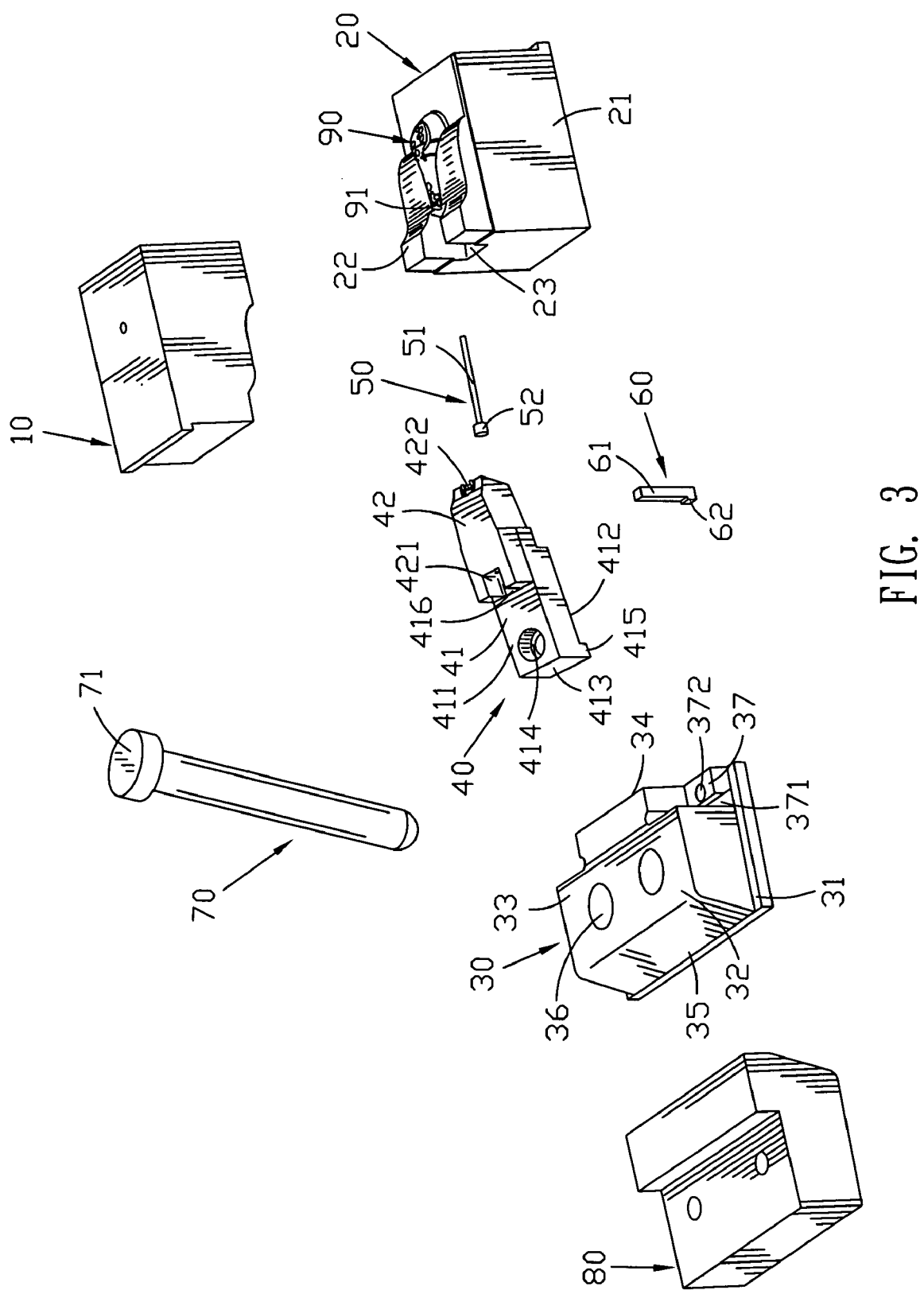
FIG. 3 is an exploded view of the slide having the fixing mechanism of the slide insert and a mold using the same.

With reference to FIG. 3, a mold with the slide having the fixing mechanism of the slide insert 1 further includes a cavity insert 10, a core insert 20 disposed under the cavity insert 10, a stopping block 30, an angular pin 70 inserted in the stopping block 30, an angle wedge 80 withstanding the stopping block 30.

The stopping block 30 includes a basic member 31. Both sides of the basic member 31 shrinks inside and then stretches upward to form a supporting portion 32. The supporting portion 32 includes a top plank 33, a front plank 34 and a back plank 35. Each side of the top plank 33 defines an inclined hole 36 passing through the top plank 33 to the bottom of the basic member 31 and inclining to back. The front plank 34 opens a fitting section 37 at each side. The fitting section 37 extends backward and passes through the top plank 34. The top surface of the fitting section 37 opens a groove 371 connecting with the front plank 34. A passing hole 372 is defined in the front of the groove 371. The back plank 35 as well as the basic member 31 inclines to back.

The angular pin 70 is a circular shaft with the top end protruding around to form a projection wheel 71. The angle wedge 80 is placed horizontally and the back wall inclines to back. The core insert 20 has a rectangular base portion 21. Each side of the top of the base portion 21 protrudes upward and forms a block 22. Between the two blocks 22 it forms an opening 23. At the back of the opening 23, the two blocks 22 clip a product 90. The front of the product 90 opens a circular cavity 91. When the cavity insert 10 mates with the core insert 20, a mold cavity is formed therebetween. The product 90 is held in the mold cavity.

Figure 4:
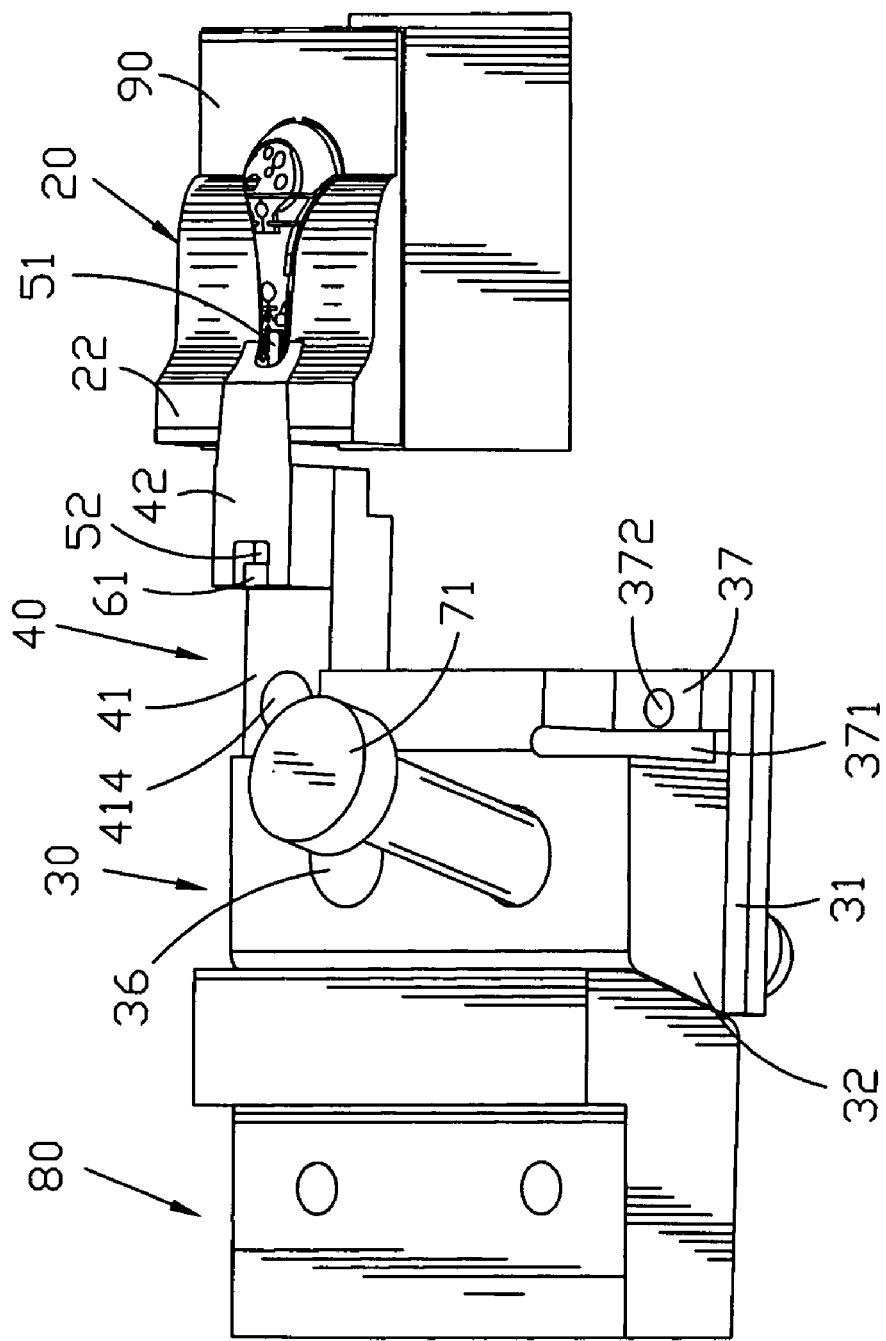
FIG. 4 is an assembled view of the slide and the mold without a cavity insert.
Figure 5:
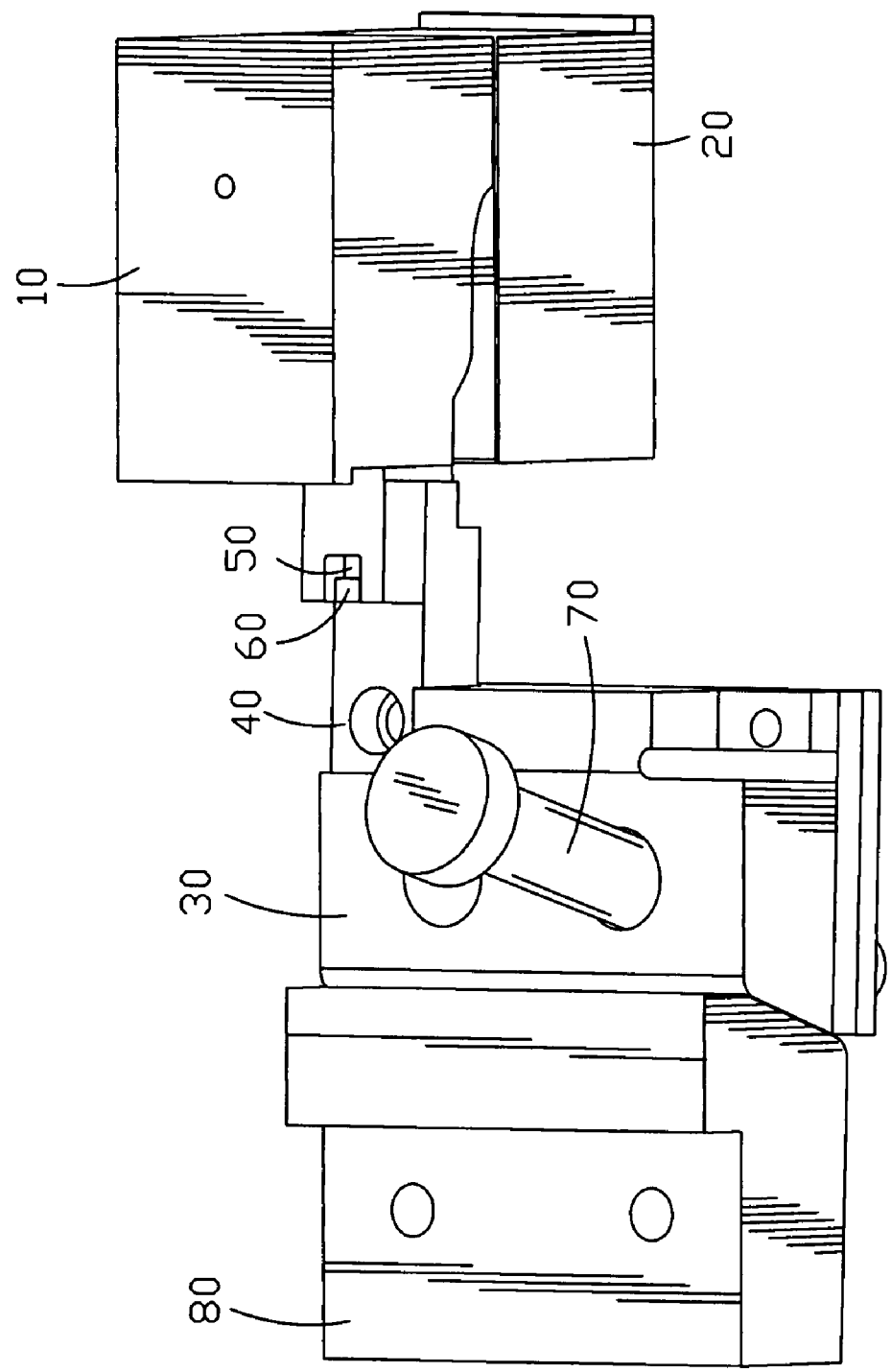
FIG. 5 is an assembled view of FIG. 4 and the cavity insert.

Referring to FIGS. 4-5, the slide with the fixing mechanism of the slide insert 1 is assembled in the mold. The combination of the slide body 40, the slide insert 50 and the slide core 60 is assembled with the core insert 20 and the stopping block 30. The front of the inserting portion 42 of the slide body 40 is inserted in the opening 23 of the core insert 20. The circular shaft 51 of the slide insert 50 is inserted in the circular cavity 91 of the product 90 to shape the mold hole. Then the cavity insert 10 buckles with the core insert 20. The connecting portion 41 of the slide body 40 is fixed on the fitting section 37 with the mounting portion 415 is inserted in the groove 371 of the stopping block 30. The locating hole 414 and the passing hole 372 are the same axle center to fix the slide body 40. The angular pin 70 is inserted in the inclined hole 36 with the projection wheel 71 preventing the angular pin 70 falling, and the angle wedge 80 withstands the back plank 35 of the stopping block 30.

When the mold with the slide is opened, the angle wedge 80 removes from the stopping block 30. The angular pin 70 is pulled out from the inclined hole 36. In the process of pulling the angular pin 70 out from the inclined hole 36, the force coming from the action of the stopping block 30 on the angular pin 70 drives the stopping block 30 and the slide body 40 to remove and further drives the slide insert 50 to remove from the core insert 20. Then the circular shaft 51 is taken out of the circular cavity 91, while the cavity insert 10 and the core insert 20 are opened. A plastic product is ejected from the mold cavity so as to be taken out (not shown).

According to the present invention, the locating pillar 61 of the slide core 60 is inserted in the core hole 416 of the slide body 40 to fix the preventing part 52 of the slide insert 50 between the back of the inserting portion 42 and the locating pillar 61. That is, the slide insert 50 is fixed in the slide body 40. When the slide insert 50 is very small accordance with a small product, it can be fixed steadily by the slide 1.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A slide having a fixing mechanism of a slide insert, comprising:
   a slide body, having a connecting portion and an inserting portion, the connecting portion defining a locating hole which stretches through the top surface to bottom surface of the connection portion, the inserting portion defining an inserting hole passing through the front and back surface of the insertion portion, a core hole defined at the junction of the connecting portion and the inserting portion;
   a slide insert, located in the inserting hole, one end of the slide insert protruding around to form a preventing part; and
   a slide core, inserted in the core hole to fix the preventing part of the slide insert between the back surface of the inserting portion and the slide core;
   wherein the slide core including a rectangular locating pillar, one end of the locating pillar protruding outside to form a buckling part, and the buckling part buckling with the bottom of the core hole of the slide body.

2. The slide having the fixing mechanism of the slide insert as claimed in claim 1, wherein the inserting portion defines a receiving hole at the rear of the top surface which passes through the core hole, the preventing part of the slide insert and the slide core are received in the receiving hole.

* * * * *